United States Patent [19]
Shuman

[11] Patent Number: 5,650,874
[45] Date of Patent: Jul. 22, 1997

[54] OPTICAL BEAMSPLITTER

[75] Inventor: Curtis A. Shuman, Colorado Springs, Colo.

[73] Assignee: Discovision Associates, Irvine, Calif.

[21] Appl. No.: 710,640

[22] Filed: Sep. 18, 1996

Related U.S. Application Data

[60] Continuation of Ser. No. 446,365, May 22, 1995, abandoned, which is a division of Ser. No. 705,780, May 28, 1991, abandoned.

[51] Int. Cl.$^6$ .............................. G02B 5/30; G02B 27/14; G02B 27/28; G11B 7/00
[52] U.S. Cl. .......................... 359/487; 359/490; 359/495; 359/583; 359/589; 359/629; 359/634; 359/638; 369/110; 369/112; 369/121; 250/201.5; 250/225
[58] Field of Search .................... 359/487, 494, 359/495, 496, 497, 583, 629, 634, 831, 833, 589, 638, 834; 369/110, 112, 121, 44.12, 44.14, 44.23, 44.37, 116; 250/201.5, 225

[56] References Cited

U.S. PATENT DOCUMENTS

| | | | |
|---|---|---|---|
| 1,722,357 | 7/1929 | Romer | 359/638 |
| 1,898,787 | 2/1933 | Newcomer . | |
| 2,088,660 | 8/1937 | Newcomer . | |
| 2,240,988 | 5/1941 | Hertel | 359/638 |
| 2,405,960 | 8/1946 | Land . | |
| 2,409,407 | 10/1946 | Turner | 359/487 |
| 2,432,432 | 12/1947 | MacNeille . | |
| 2,815,695 | 12/1957 | Scharf et al. | 359/583 |
| 2,816,480 | 12/1957 | Tushinsky et al. . | |
| 3,514,182 | 5/1970 | Banks | 359/833 |
| 3,536,375 | 10/1970 | Mansell . | |
| 3,559,090 | 1/1971 | Refermat et al. . | |
| 3,652,167 | 3/1972 | Smith . | |
| 3,677,621 | 7/1972 | Smith . | |
| 3,844,638 | 10/1974 | Lingenfelder et al. . | |
| 3,922,069 | 11/1975 | Kishikawa et al. . | |
| 3,943,019 | 3/1976 | Krekeler et al. . | |
| 3,992,574 | 11/1976 | Bouwhuis et al. . | |
| 3,998,524 | 12/1976 | Hubby, Jr. et al. . | |

(List continued on next page.)

FOREIGN PATENT DOCUMENTS

| | | |
|---|---|---|
| 5972 | 12/1979 | European Pat. Off. . |
| 95622 | 7/1983 | European Pat. Off. . |
| 40606 | 3/1984 | Japan . |
| 271963 | 6/1927 | United Kingdom . |
| 561503 | 5/1944 | United Kingdom . |
| 1396712 | 6/1975 | United Kingdom . |
| 1468679 | 3/1977 | United Kingdom . |
| 1513314 | 6/1978 | United Kingdom . |
| 1561407 | 2/1980 | United Kingdom . |
| 2087584 | 5/1982 | United Kingdom . |
| 2121211 | 12/1983 | United Kingdom . |
| 2165639 | 4/1986 | United Kingdom . |

OTHER PUBLICATIONS

Yamanaka, et al.., "Compact Magneto–Optical Disk Head Integrated with Chip Elements", Optical Data Storage Conference 1991 Technical Digest Series, vol. 5, pp. 138–141, Feb. 25–27, 1991.

*Primary Examiner*—Ricky D. Shafer
*Attorney, Agent, or Firm*—Ronald J. Clark; Robert T. Braun; Donald Bollella

[57] ABSTRACT

An optical beamsplitter comprises a right angle prism having a hypotenuse and two legs wherein the hypotenuse includes an optically selective coating deposited thereon. An optical element is positioned adjacent the hypotenuse such that the hypotenuse and the optical element form a beamsplitting interface. Various optical elements are utilized to achieve the desired spatial and angular relationships between incoming and outgoing light beams. Several embodiments are disclosed wherein the optical element can comprise a flat plate for providing spatial offset, a wedged plate for producing spatial and angular offset, a lens for adding optical power, or a faceted thin plate.

5 Claims, 5 Drawing Sheets

U.S. PATENT DOCUMENTS

| | | |
|---|---|---|
| 4,084,180 | 4/1978 | Stoffels et al. . |
| 4,084,881 | 4/1978 | Hirabayashi et al. . |
| 4,128,308 | 12/1978 | McNaney . |
| 4,253,723 | 3/1981 | Kojima et al. . |
| 4,282,598 | 8/1981 | Elliott . |
| 4,333,173 | 6/1982 | Yonezawa et al. . |
| 4,334,300 | 6/1982 | Arquie et al. . |
| 4,358,200 | 11/1982 | Heemskerk et al. . |
| 4,399,529 | 8/1983 | Leterme et al. . |
| 4,411,492 | 10/1983 | Bluege ................................ 359/583 |
| 4,411,500 | 10/1983 | Yonezawa et al. . |
| 4,422,168 | 12/1983 | Ito et al. . |
| 4,423,495 | 12/1983 | Musha et al. . |
| 4,423,496 | 12/1983 | Opheij et al. . |
| 4,425,636 | 1/1984 | Musha et al. . |
| 4,441,175 | 4/1984 | Shuman . |
| 4,447,722 | 5/1984 | Saimi . |
| 4,450,547 | 5/1984 | Nakamura et al. . |
| 4,451,913 | 5/1984 | Elliott . |
| 4,453,239 | 6/1984 | Musha . |
| 4,455,085 | 6/1984 | Kato et al. . |
| 4,458,980 | 7/1984 | Ohki et al. . |
| 4,489,408 | 12/1984 | Verhoeven et al. . |
| 4,497,534 | 2/1985 | Sincerbox . |
| 4,502,783 | 3/1985 | Lau et al. . |
| 4,504,938 | 3/1985 | Tajima . |
| 4,507,766 | 3/1985 | Saimi et al. . |
| 4,525,625 | 6/1985 | Abe . |
| 4,542,492 | 9/1985 | Leterme et al. . |
| 4,565,426 | 1/1986 | Cullen . |
| 4,573,149 | 2/1986 | Deguchi et al. . |
| 4,607,356 | 8/1986 | Bricot et al. . |
| 4,612,437 | 9/1986 | Ohsato . |
| 4,624,526 | 11/1986 | Tsukai et al. . |
| 4,627,690 | 12/1986 | Fantone . |
| 4,641,926 | 2/1987 | Shirasaki . |
| 4,679,891 | 7/1987 | Roberts . |
| 4,689,481 | 8/1987 | Ono . |
| 4,691,098 | 9/1987 | Maeda . |
| 4,694,447 | 9/1987 | Cohen et al. . |
| 4,716,559 | 12/1987 | Hine . |
| 4,733,065 | 3/1988 | Hoshi et al. . |
| 4,750,819 | 6/1988 | Sugiki . |
| 4,770,507 | 9/1988 | Arimoto et al. . |
| 4,800,556 | 1/1989 | Charlier et al. . |
| 4,804,835 | 2/1989 | Ando ................................ 359/110 |
| 4,808,823 | 2/1989 | Moore et al. . |
| 4,809,247 | 2/1989 | Elliott . |
| 4,822,151 | 4/1989 | Tatsuno et al. . |
| 4,823,335 | 4/1989 | Shikama et al. . |
| 4,825,064 | 4/1989 | Ando ................................ 369/44.37 |
| 4,850,686 | 7/1989 | Morimoto et al. . |
| 4,862,442 | 8/1989 | Tadokoro et al. . |
| 4,863,246 | 9/1989 | Anthon . |
| 4,872,747 | 10/1989 | Jalkio et al. . |
| 4,876,680 | 10/1989 | Misawa et al. . |
| 4,890,272 | 12/1989 | Ando ................................ 369/116 |
| 4,907,858 | 3/1990 | Hara et al. ................................ 359/629 |
| 4,948,233 | 8/1990 | Maruyama . |
| 4,998,011 | 3/1991 | Shuman . |
| 5,051,974 | 9/1991 | Taniguchi et al. . |
| 5,095,389 | 3/1992 | Yokomori . |
| 5,095,476 | 3/1992 | Greve et al. . |
| 5,105,407 | 4/1992 | Ishika ................................ 369/44.37 |
| 5,136,558 | 8/1992 | Getreuer et al. . |
| 5,150,350 | 9/1992 | Aikoh et al. . |
| 5,151,889 | 9/1992 | Saimi et al. ................................ 369/112 |
| 5,155,633 | 10/1992 | Grove et al. . |
| 5,177,640 | 1/1993 | Grassens . |
| 5,237,446 | 8/1993 | Takahashi ................................ 359/583 |
| 5,245,174 | 9/1993 | Prikryl et al. . |
| 5,313,332 | 5/1994 | Schell et al. . |
| 5,331,622 | 7/1994 | Ernst et al. ................................ 369/110 |
| 5,349,175 | 9/1994 | Prikryl . |
| 5,568,315 | 10/1996 | Shuman ................................ 369/112 |

OPTICAL BEAMSPLITTER

CROSS REFERENCE TO RELATED APPLICATIONS

This application is a continuation of U.S. patent application Ser. No. 08/446,365 filed May 22, 1995, now abandoned, which is a divisional application of U.S. patent application Ser. No. 07/705,780 filed May 28, 1991, now abandoned.

FIELD OF THE INVENTION

The invention relates to optical beam splitters/combiners.

BACKGROUND OF THE INVENTION

In many optical systems, it is often useful to separate and/or combine light beams having different optical characteristics, e.g., polarization states, wavelengths, etc. For example, in optical data storage systems, the optical qualities of the storage medium are altered in a manner such that changes in the reflective or transmissive properties of the medium are representative of the information recorded thereon. This information is commonly transmitted to and retrieved from the optical medium using light beams produced by a laser light source.

The information recorded on the disc is retrieved from the disc by directing a laser beam onto the disc. The reflected laser beam is then directed onto the detecting surface of a photodiode or other light detector system which transforms the reflected or transmitted laser beam signal into an electrical signal. In this manner, the data stored on the disc is transferred from the disc to the laser beam and converted into an electrical signal which carries the same information recorded on the disc. This electrical signal is further processed, and ultimately results in retrieval of the computer data, audio sound, video images, etc., represented by the information recorded on the disc.

Separating and combining optical beams is useful in several ways in such optical disc systems. For example, in many optical disc memory systems, it is desirable to use a single laser source to produce both the read and write beams, thus resulting in a smaller and more compact system design. However, when using a single laser source, it then becomes necessary to be able to separate and distinguish the two beams. In addition, read only systems are often utilized in connection with optical discs which require separation of the incident and reflected read beams. Furthermore, it is necessary to separate the two polarization states of the reflected read beam to detect the data stored on the disc.

The most common technique used to achieve these separations utilizes combinations of cube beamsplitters and right angle prisms. The cube beamsplitter has a center interface selected such that it is sensitive to the desired parameter of interest, i.e., polarization, wavelength, etc. The beamsplitter is then typically combined with one or more right angle prisms attached to selected faces of the cube used to create the desired separation/combination geometry. This type of design is often too bulky and/or too heavy for use in many miniaturized optical heads. In addition, this separation technique requires that the beam be detected by separate, or widely separated, detectors, thereby increasing the volume requirements of the optical system.

A second technique frequently used to separate light beams involves connecting a right angle prism to a large cube. The angles of the larger cube are selected such that the transmitted beam circulates around the cube and exits the cube at an angle which is offset with respect to the reflected beam. This design, too, is typically very heavy and requires too much space for incorporation into miniature optical heads, thereby making it inefficient in many applications.

SUMMARY OF THE INVENTION

The present invention provides a small, compact beamsplitter which can be used in a variety of applications. The optical beamsplitter of the present invention comprises a right angle prism having a hypotenuse and two legs wherein the hypotenuse includes an optically selective coating deposited thereon. An optical element is positioned adjacent the hypotenuse such that the hypotenuse and the optical element form a beamsplitting interface. Incoming light is transmitted so as to be incident upon the interface and is separated or combined in accordance with the optical characteristics of the coating. In some preferred embodiments, the coating comprises a polarization sensitive coating such that the incoming light is separated or combined in accordance with the polarization components of the light incident upon the interface. The optical element adjacent the hypotenuse is selected so as to produce the desired spatial and/or angular relationships between the separated/combined beams. In some embodiments, these optical elements include flat plates used to provide spatial separation between beams, wedged plates which produce angular separation between beams, and lenses which add optical power to the beams.

The present invention provides an optical beamsplitter comprising a first right angle prism including a first leg having a first length and a second leg having a second length wherein the first and second legs are joined by a hypotenuse. A thin optical element is positioned adjacent the hypotenuse. The optical element has a front surface and a rear surface defining a maximum thickness which is less than the first and second lengths of the first and second legs of the prism. An optically selective coating is positioned intermediate the hypotenuse and the front surface of the optical element to form a first beamsplitting interface. The optical element may have a first thickness at a first location and a second thickness at a second location wherein the first thickness is not equal to the second thickness. The rear surface of the optical element may be flat. The rear surface of the optical element may also be multi-faceted. The optically selective coating may comprise a polarization sensitive coating. The optically selective coating may also comprise a wavelength sensitive coating. The optical beamsplitter may further include a second right angle prism having a hypotenuse and two legs wherein the hypotenuse of the second prism is positioned adjacent the rear surface of the thin optical element. The second right angle prism may have a partially reflective coating deposited on the hypotenuse to form a second beamsplitting interface. The front and rear surfaces of the thin optical element may be parallel. Further, the rear surface of the thin optical element may have a coating deposited thereon.

In one aspect of the invention, an optical beamsplitter is disclosed comprising a first right angle prism having first and second legs joined by a hypotenuse wherein the first leg has a first length and the second leg has a second length wherein the hypotenuse includes an optically selective coating deposited thereon. The beamsplitter further comprises a wedged plate having a front and a rear surface wherein the front and rear surfaces are non parallel. The front surface of the plate is positioned adjacent the hypotenuse. The plate has a maximum thickness which is less than the first and second lengths. The optically selective coating may comprise a polarization sensitive coating. The optically selective coating may also comprise a wavelength sensitive coating. The rear surface of the wedged plate may have a reflective coating deposited thereon.

In another aspect of the invention, an optical beamsplitter is disclosed which comprises a first right angle prism having first and second legs joined by a hypotenuse wherein the first leg has a first length and the second leg has a second length and the hypotenuse includes an optically selective coating deposited thereon. The beamsplitter further comprises a lens having a front surface and a rear surface wherein the front surface of the lens is positioned adjacent the hypotenuse. The lens has a maximum thickness which is less than the first and second lengths. The optically selective coating may comprise a polarization sensitive coating. The optically selective coating may also comprise a wavelength sensitive coating. The rear surface of the lens may have a reflective coating deposited thereon.

In yet another aspect of the invention, an optical beamsplitter is disclosed which comprises a first plate, a second plate positioned adjacent the first plate, and an optically selective coating positioned intermediate the first and second plates to form a beam splitting interface. The optically selective coating may comprise a polarization sensitive coating. The second plate may include a front surface and a rear surface wherein the front surface is positioned adjacent the first plate and the rear surface has a reflective coating deposited thereon.

DETAILED DESCRIPTION OF THE INVENTION

Figure 1:
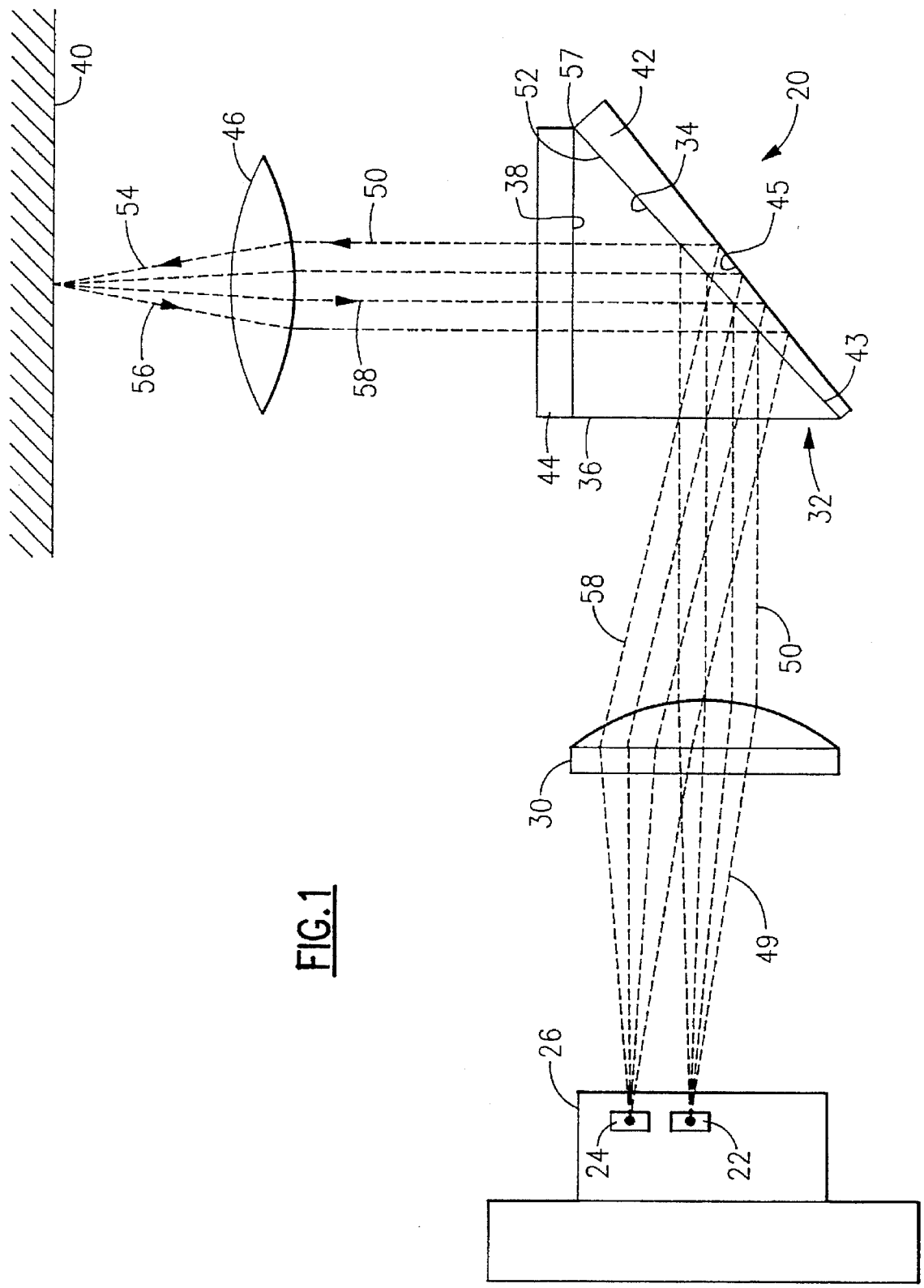
FIG. 1 is a schematic illustration of an optical disc memory system incorporating a half-cube beamsplitter comprising a right-angle prism, a wedged plate, and a quarter wave plate in accordance with the present invention.

FIG. 1 illustrates a half-cube beamsplitter 20 in accordance with the present invention as incorporated in an optical data storage system. The system includes a source 22 and a detector 24 constructed as a single unit or package 26. A collimator lens 30 is positioned intermediate the source/detector package 26 and the beamsplitter 20. The beamsplitter 20 comprises a right angle prism 32 having three sides, which as viewed from the top in FIG. 1, appear as a hypotenuse 34 and two legs 36, 38 of a right-angle triangle, wherein the first leg 36 faces the source/detector package 26 and the second leg 38 faces an information medium, such as an optical disc 40. The beamsplitter 20 further includes a wedged plate 42 having a front surface 43 and a rear surface 45. The legs of the prism are preferably approximately 6 mm, and the maximum thickness of the wedged plate 42 is less than the length of the legs of the prism 32 and is preferably in the range of 0.5 to 2 mm. The wedged plate 42 is located adjacent to the hypotenuse 34 of the right angle prism 32. A quarter wave plate 44 is adjacent to the second leg 38 of the prism 32 and a convex objective lens 46 is positioned intermediate the quarter wave plate 44 and optical disc 40.

It should be understood that although specific dimensions have been given for a preferred embodiment, the proportions of the prism 32 and plate 42 could be scaled for implementation in numerous other optical systems in a variety of applications. For example, in an optical system with larger physical dimensions, the dimensions of the prism and plate could be made larger while still maintaining the same proportional relationship, and conversely, in an optical system with smaller physical dimensions, the dimensions of the prism and the plate could be made smaller while still maintaining the same proportional relationship.

The source 22 typically comprises a semiconductor laser which emits diverging light 49 through the collimating lens 30. The collimating lens 30 renders the incoming light rays 49 substantially parallel and transmits the collimated light 50 toward the beamsplitter 20. The hypotenuse 34 of the prism 32 is coated with a polarization sensitive coating at a beam splitting interface 52 formed between the hypotenuse surface 34 of the prism 32 and the front surface 43 of the wedged plate 42. In this configuration, collimated laser light, incident upon the beam splitting interface, is preferably linearly polarized such that the light will be reflected by the beamsplitter 20 toward the quarter wave plate 44. The beamsplitter 20 is preferably oriented such that the incoming light beam 50 is incident upon the interface 52 at a 45 degree angle, and is thus orthogonally deflected toward the quarter wave plate 44. Upon passing through the quarter wave plate 44, the incident linearly polarized light becomes circularly polarized. This collimated circularly polarized light 54 is then focused onto the surface of the optical disc 40 by the objective lens 46.

Assuming the beam is properly focused on the recorded surface of the optical disc 40, a reflected beam 56 will be imaged back onto the same path as the incident light 54. As is well known to those skilled in the art, the reflected beam 56 is modulated in accordance with the information recorded upon the surface of the disc 40. Upon reflection from the disc 40, the modulated reflected beam 56 is transmitted back through the objective lens 46 and quarter wave plate 44. The quarter wave plate 44 renders the circularly polarized reflected beam 56 linearly polarized, but phase shifted by 90 degrees, one quarter of a wavelength, from the incident linearly polarized beam 50. As the now linearly polarized reflected beam 58 strikes the beam splitting interface 52, it is transmitted through the interface 52 to the rear surface 45 of the wedged plate 42. Because of the wedge angle between the front and rear surfaces 43, 45, the polarized reflected beam 58 strikes the rear surface 45 of the plate 42 at an angle greater than 45 degrees and is thus reflected at an angle with respect to the incoming beam 50 toward the lens 30. The lens 30 causes the reflected beam 58 to converge at the detector 24. The angle between the front and rear surfaces 43, 45 Of the wedged plate 42 is selected so as to cause the reflected light beam 58 to converge on the detector 24. The detector 24 is typically a photodetector which transforms the optical signal into an electrical signal carrying the same information encoded on the disc 40 and contained in the modulated reflected light beam 58. In this manner, the beamsplitter 20 of the present invention functions to provide separate optical paths for the transmitted and reflected beams 50, 58 such that the source 22 and detector 24 can be located in close proximity to one another in the same package 26. For use in optical disc memory systems, this provides a significant reduction in total weight and space of the optical head which carries the source/detector package 26 and beamsplitter 20.

Figure 2:
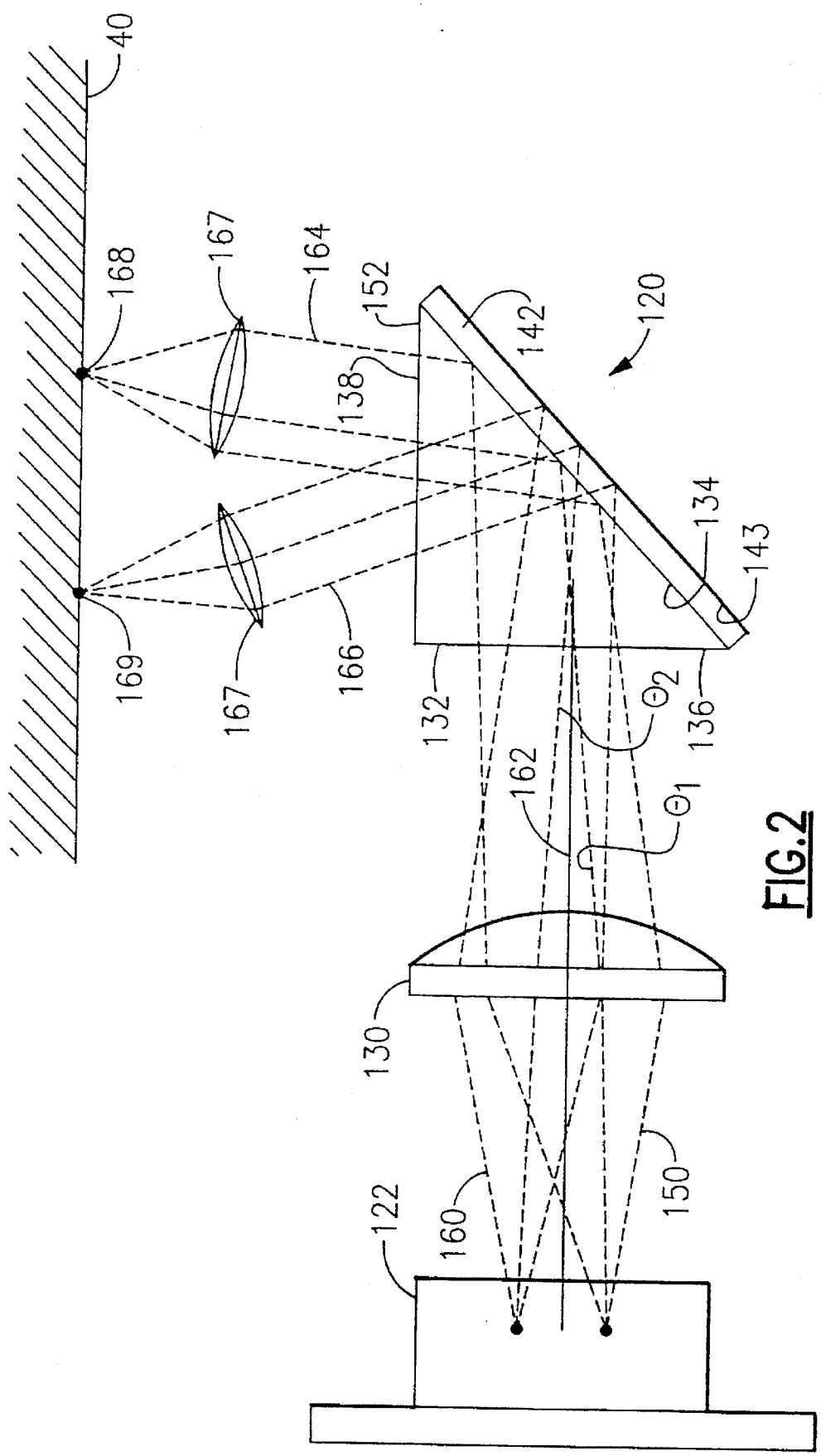
FIG. 2 is a schematic illustration of a half-cube beamsplitter comprising a right-angle prism and a flat plate used to transmit light beams of two different wavelengths emitted from a dual wavelength source.

FIG. 2 illustrates how a half-cube beamsplitter 120 can be utilized to transmit beams of two distinct wavelengths. The beamsplitter comprises a right-angle prism 132 having a hypotenuse 134 and two legs 136, 138. A flat plate 142 is placed adjacent to the hypotenuse 134 of the prism 132. The hypotenuse 134 forms a beamsplitting interface 152 and is coated so as to be sensitive to a particular wavelength, for example, to reflect a particular wavelength and transmit all other wavelengths of incoming light. A dual wavelength source 122 emits two diverging light beams 150, 160 with two distinct wavelengths. For example, in optical data system applications, this configuration could be used to combine the transmission of read and write beams through a single optical head. The beams 150, 160 are transmitted through a collimator lens 130 having a central optical axis 162. Upon exiting the collimator lens 130, each of the beams 150, 160 is collimated but at different angles with respect to the central axis 162 of the lens 130, i.e., the collimated light rays of beam 150 form an angle of $\Theta_1$ with respect to the optical axis 162 while the collimated light rays of beam 160 form an angle $\Theta_2$ with respect to the axis 162. The collimated, angled beams 150, 160 are directed through the first leg 136 of the prism 132 and are incident upon the beam splitting interface 152.

The beam splitting interface 152 is coated with a wavelength sensitive coating which reflects a selected wavelength of incident light and transmits light of all other wavelengths. Alternatively, the coating may be designed to transmit light of a selected wavelength and reflect all other wavelengths. Upon striking the interface 152, the incident beam 150 having the first, selected wavelength is reflected off the interface 152 at an angle equal to the angle of incidence forming a first outgoing beam 164, and the incident beam 160 having the second, non-selected wavelength is transmitted through the interface 152 to a rear surface 143 of the flat plate 142. The length of the legs 136, 138 is preferably approximately 6 mm and the thickness of the plate 142 is substantially less than the length of the legs 136, 138 of the prism 132 and is preferably in the range of 0.5 to 2 mm. Although specific dimensions have been given for a preferred embodiment, the proportions of the prism 132 and plate 142 could be scaled for implementation in numerous other optical systems in a variety of applications. At the rear surface 143 of the plate 142, the beam 160 having the second wavelength is reflected forming a second outgoing beam 166. This could be accomplished numerous ways including coating the rear surface 143 of the plate 142 with a highly reflective coating, or orienting the plate 142 such that total internal reflection occurs and the beam 160 is reflected at an angle equal to the angle of incidence.

After exiting the beamsplitter 120, the two beams 164, 166 remain collimated but are angularly offset and displaced depending on the incoming angle of incidence and the thickness and wedge angle of the plate 142. For application in reading and writing data to an optical disc, the first beam 164 could be focused with a converging lens 167 to a first point 168 on the disc and the second beam 166 could be focused, in a similar manner, to a second point 169 on the disc, one beam serving to read information from the disc and the other beam serving to write information to the disc. One skilled in the art will further realize that this configuration could be readily applied to any optical system where it is desired to provide separate optical paths for two light beams emitted from a dual wavelength source.

Figure 3:
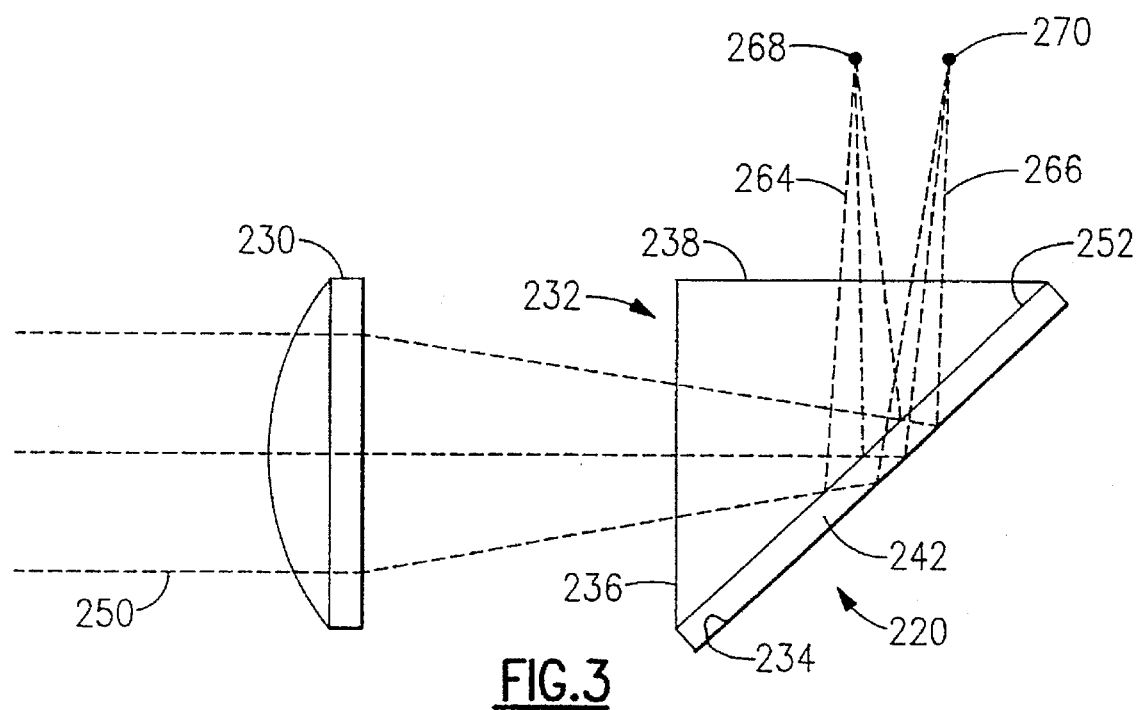
FIG. 3 is a schematic view of a half-cube beamsplitter comprising a right-angle prism and a flat plate which produces two outgoing beams focused at separate focal points.

FIG. 3 shows a beamsplitter configuration 220 in accordance with the present invention which splits an incoming light beam 250 into two outgoing light beams 264, 266 focused on two spatially separate focal points 268, 270. The beamsplitter 220 comprises a right angle prism 232 having a hypotenuse 234 and two legs 236, 238, wherein a flat plate 242 is attached to the hypotenuse 234. As with the embodiment illustrated in FIG. 2, the plate 242 has a thickness which is substantially less than the length of the legs 236, 238 of the prism 232. Preferably, the length of the legs 236, 238 is approximately 6 mm and the thickness of the plate 242 ranges from 0.5 mm to 2 mm. The hypotenuse 234 forms a beamsplitting interface 252 having an optically selective coating deposited thereon. A lens 230 is positioned adjacent the first leg 236 of the prism 232. It should be understood that although specific dimensions have been given for a preferred embodiment, the proportions of the prism 232 and plate 242 could be scaled for implementation in numerous other optical systems in a variety of applications.

The incoming beam 250 enters the lens 230 collimated and exits the lens 230 in converging rays. The converging rays then enter the beamsplitter 220 through the first leg 236 and are incident upon the beamsplitting interface 252. The interface 252 is coated with an optically selective coating, such as a polarization sensitive coating which splits the incoming beam 250 so that light having a first, selected polarization component is reflected at an angle equal to the angle of incidence to form the first outgoing beam 264, and light having a second, non-selected polarization component is transmitted. Alternatively, the coating could be wavelength selective so as to reflect/transmit a selected wavelength of incoming light. The transmitted light is incident upon the rear surface of the flat plate 242 and is reflected, forming the second outgoing beam 266. Light reflection at the rear surface can be accomplished in a variety of ways including application of a high reflectivity coating to the rear surface and selection of the plate 242 to effect total internal reflection as described above. Both beams 264, 266 exit the beamsplitter 220 through the second leg 238 of the prism 232 in two separate sets of converging rays which can be focused upon two distinct points 268, 270. For example, the two beams 264, 266 could be focused on two different portions of an optical disc to read or write data on the disc, wherein the distance between the focal points is determined by the thickness of the plate 242. In addition, the beams 264, 266 could represent portions of the reflected read beam which are focused upon separate photodetectors for application in focus error detection.

Figure 4:
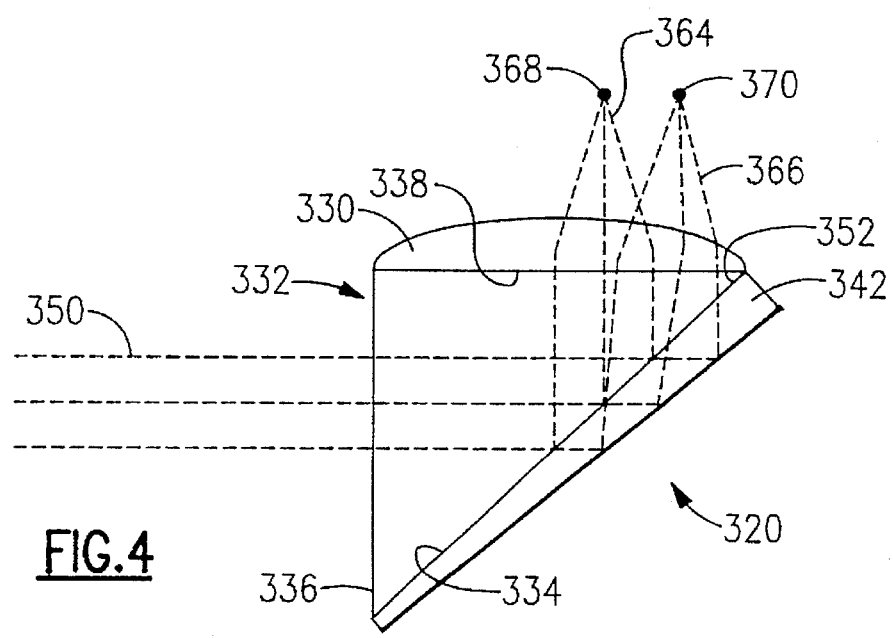
FIG. 4 is a schematic view of an alternative embodiment of a half-cube beamsplitter comprising a right-angle prism and a wedged plate which produces two outgoing beams focused at separate focal points.

A similar arrangement is shown in FIG. 4, however, in this configuration, a focusing lens 330 is positioned after the beam separation occurs. This arrangement can also be applied to optical disc systems where it is desired to provide two separate read/write beams or to separate the polarization states of a return beam for use in servo techniques. In this configuration, a collimated beam of light 350 is incident upon a half-cube beamsplitter 320. The beamsplitter 320 comprises a right-angle prism 332 having two legs 336, 338 and a hypotenuse 334, wherein a wedged plate 342 is attached to the hypotenuse 334. Preferably, the length of the legs 336, 338 is approximately 6 mm. The maximum thickness of the wedged plate 342 is in the range of 0.5 to 2 mm and is substantially less than the lengths of the legs 336, 338. It Should be understood that although specific dimensions have been given for a preferred embodiment, the proportions of the prism 332 and plate 342 could be scaled for implementation in numerous other optical systems in a variety of applications. The hypotenuse 334 forms a beam splitting interface 352 having an optically selective coating, such as a polarization or wavelength sensitive coating, deposited thereon. Upon entering the beamsplitter 320 through the first leg 336, the incoming beam 350 is split such that a first portion of the beam 350 having a first, selected polarization state is reflected off the interface to form a first outgoing beam 364 while a second portion of the beam 350 having a second, non-selected polarization state is transmitted through the interface 352. The incoming beam 350 is incident upon the beam splitting interface 352 at a 45 degree angle and is orthogonally reflected toward the second leg 336 of the prism 332. The transmitted portion of the collimated beam 350 is incident upon the rear surface of the wedged plate 342 and deflected off the plate 342 using a reflective coating, total internal reflection, or other known methods, and forms a second outgoing beam 366. The wedged plate 342 causes the angle of incidence of the transmitted portion of the beam 350 to vary with respect to the angle of the wedge, thus causing the portion of the beam 350 reflected off the rear surface of the plate 342 to be angularly offset from the portion of the beam 350 reflected off the interface 352. The two outgoing beams 364, 366 then exit the beamsplitter 320 in collimated rays which are angularly offset and are transmitted through the focusing lens 330. After exiting the lens, the outgoing beams 364, 366 are caused to converge on two distinct focal points 368, 370, which, in an optical storage system, may advantageously be two detectors for generating focus error signals, or two read or write locations on the surface of an optical disc.

A half-cube beamsplitter in accordance with the present invention is shown in several additional embodiments in FIGS. 5 through 9. In each embodiment below, the beamsplitter comprises a right angle prism having a hypotenuse joined to first and second legs. The hypotenuse forms a beam splitting interface and typically includes a polarization sensitive coating deposited thereon, however, as in the embodiments described above, the interface could have any optically selective coating thereon to separate beams in accordance with any desired optical property of the incident beam. For example, a wavelength selective coating may be used to separate incoming beams in accordance with the wavelength of the incident light. As will be explained in more detail below, various thin optical elements are attached to the hypotenuse to achieve the desired spatial and angular relationships between the incoming and outgoing beams. As in previous embodiments, the lengths of the legs of the prism is preferably approximately 6 mm. Each optical element described below preferably has a maximum thickness which is less than the lengths of the legs of the prism and is preferably in the range of 0.5 to 2 mm. It should be understood that although specific dimensions have been given for preferred embodiments, the proportions of the prism and optical elements could be scaled for implementation in numerous other optical systems in a variety of applications.

Figure 5:
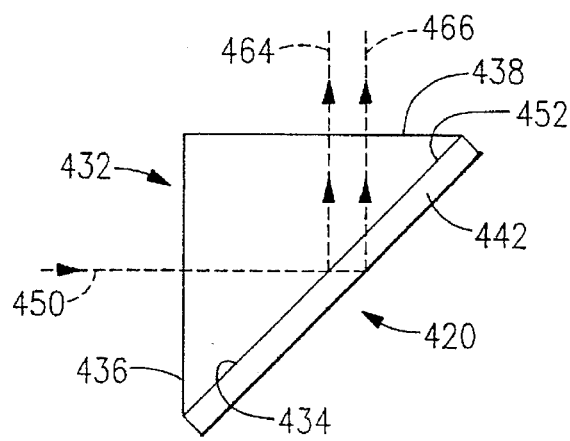
FIG. 5 is a schematic representation of a half-cube beamsplitter comprising a right-angle prism and a flat plate which separates an incoming beam into two parallel offset outgoing beams.

In FIG. 5, a half-cube beamsplitter 420 in accordance with the present invention is used to separate an incoming beam 450 into first and second outgoing beams 464, 466 having a parallel offset with respect to each other. In the context of optical data storage systems, this configuration could be advantageously used to separate a read beam and a write beam which carry data to and transmit data from an optical disc. The beamsplitter 420 comprises a right angle prism 432 having two legs 436, 438 and a hypotenuse 434, and a flat plate 442 which is attached to the hypotenuse 434. The hypotenuse 434 of the prism 432 forms a beamsplitting interface 452 and is coated with an optically selective coating, preferably a polarization sensitive coating. The incoming beam 450 is transmitted through the first leg 436 of the prism 432 and is incident upon the polarization sensitive interface 452 at a 45 degree angle such that the beam 450 is split into a first portion of the incoming beam 450 having a first, selected polarization state which is orthogonally reflected off the interface 452, forming the first outgoing beam 464, and a second portion of the incoming beam 450 having a second, non-selected polarization state which is transmitted through the interface 452.

The second portion of the incoming beam 450 which is transmitted through the interface 452 is incident upon the rear surface of the flat plate 442 and is reflected toward the second leg 438 of the prism 432 to form the second outgoing beam 466. The beamsplitter 420 and plate 442 are preferably oriented such that the beam strikes the rear surface at a 45 degree angle and total internal reflection occurs, thus causing the transmitted portion of the incoming beam 450 to be orthogonally reflected. The two outgoing beams 464, 466 then exit the second leg 438 of the prism 432 separated by polarization components. Furthermore, the exiting beams 464, 466 are spatially offset and travel in parallel planes. In an optical disc data system, these beams could be focused upon an optical disc in order to simultaneously read and write data, although, one skilled in the art will recognize this configuration could be used in a variety of applications where it is desired to separate an incoming light beam into two outgoing light beams.

Figure 6:
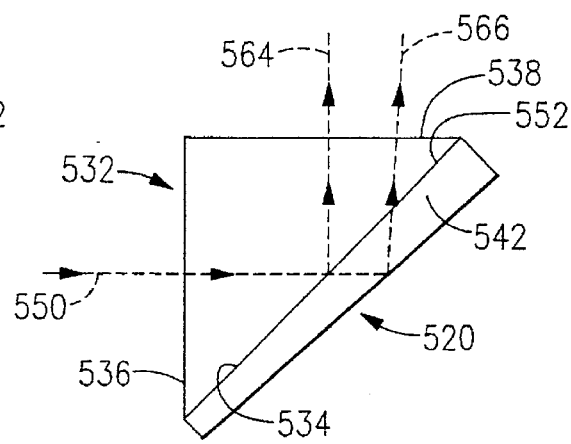
FIG. 6 is a schematic illustration of a half-cube beamsplitter comprising a right-angle prism and wedged plate which separates an incoming beam into two angularly offset outgoing beams.

Another embodiment of a beamsplitter 520 of the present invention is shown in FIG. 6. This configuration produces beam separation with an angular offset. The beamsplitter 520 comprises a right-angle prism 532 having a hypotenuse 534 and two legs 536, 538, and a wedged plate 542 attached to the hypotenuse 534. The hypotenuse 534 forms a beamsplitting interface 552 and is coated with a polarization sensitive coating, or other type of optically sensitive coating, such as a wavelength sensitive coating. In this embodiment, an incoming beam 550 is transmitted through the first leg 536 of the prism 532 and is incident upon the polarization sensitive interface 552. As in previous embodiments, the incoming beam 550 is split such that a first portion of the incoming beam 550 having a first, selected polarization state is reflected off the interface 552, forming a first outgoing beam 564, and a second portion of the incoming beam 550 having a second, non-selected polarization state is transmitted through the interface 552. The incoming light 550 is preferably incident upon the beamsplitting interface 552 at a 45 degree angle such that the first outgoing beam 564 is orthogonally reflected toward the second leg 538 of the prism 532. The transmitted portion of the beam 550 is incident upon the rear surface of the wedged plate 543 and is reflected, forming a second outgoing beam 566. Because of the varying thickness of the wedged plate 542, the transmitted portion of the beam 550 is incident at an angle greater than 45 degrees and, thus, is reflected at an angle greater than 45 degrees. Thus, the portion of the beam reflected off the rear surface of the plate 542 is reflected at an angle with respect to the portion of the beam reflected off of the beam splitting interface 552. In this manner, the outgoing beams 564, 566 exit the beamsplitter 520 separated by polarization states and angularly offset from each other.

Figure 7:
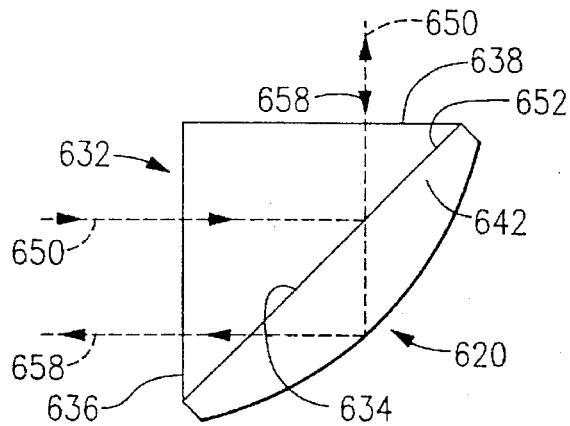
FIG. 7 is a schematic view of a half-cube beamsplitter comprising a lens and a right-angle prism which provides an outgoing beam having a path parallel to an incoming beam and adds optical power to the outgoing beam.

FIG. 7 illustrates yet another embodiment of a half-cube beamsplitter 620. The beamsplitter 620 comprises a right angle prism 632 having a hypotenuse 634 and two legs 636, 638, wherein a lens 642 is attached to the hypotenuse 634. The hypotenuse 634 is coated with an optically selective coating, and preferably, with a polarization sensitive coating. A beam of laser light 650, transmitted through the first leg 636 of the prism 632 and incident upon the beam splitting interface 652, is preferably polarized such that the light will be reflected. The beamsplitter 620 is oriented such that the incoming light beam 650 is incident upon the interface 652 at a 45 degree angle, and is thus orthogonally deflected toward the second leg 638 of the prism 632. For use in optical disc memory systems, the exiting beam 650 could then be directed toward an optical disc. Typically the beam 650 is reflected from the surface of the disc along the path of the incident light and altered in polarization by a quarter-wave plate such that the reflected beam 658 is phase-shifted by 90 degrees upon entering the beamsplitter 620. As the phase-shifted beam 658 strikes the beam splitting interface 652, it is now transmitted through the interface 652 to the rear surface of the lens 642. The rear surface of the lens 642 is coated with a reflective coating and the reflected beam 658 is deflected in a direction approximately parallel to the original path of the incident light, while further adding optical power to the reflected read beam 658 via the lens 642.

Figure 9:
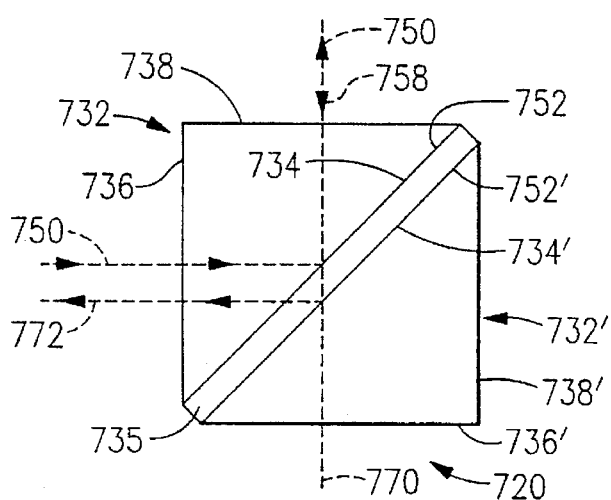
FIG. 9 is a schematic illustration of a beamsplitter comprising a right-angle prism and a flat plate which produces an outgoing beam angularly offset from an incoming beam.

A further embodiment of a beamsplitter 720 in accordance with the present invention is illustrated in FIG. 9. The beamsplitter 720 comprises two right-angle prisms 732, 732', each having a hypotenuse 734, 734', and two legs 736, 736', and 738, 738', The prisms 732, 732' are positioned such that the hypotenuse 734 of the first prism 732 faces the hypotenuse 734' of the second prism 732' and are separated by a piece of glass 735. The hypotenuse 734 of the first prism 732 forms a first beamsplitting interface 752 having a polarization sensitive coating deposited thereon. The hypotenuse 734' of the second prism 732' forms a second beamsplitting interface 752' which is coated with a partially transmissive/partially reflective coating. An incoming light beam 750 strikes the first beamsplitting interface 752 and is preferably polarized and incident upon the interface 752 at a 45 degree angle such that it is orthogonally deflected toward the second leg 738 of the first prism 732. In an optical disc memory system of the type shown in FIG. 1, this beam could be directed through a quarter wave plate toward the surface of an optical disc.

The beam is reflected from the optical disc along the same path as the incident light beam 750 and enters the beamsplitter 720 one-quarter wavelength, 90 degrees, out of phase from the original beam 750. Upon striking the first beamsplitting interface 752, the reflected beam 758 is now transmitted through the first interface 752 to the second prism 732' and is incident upon the second beamsplitting interface 752'. The second interface 752' allows a first portion of the reflected beam 758 to be transmitted through the interface 752', forming a first outgoing beam 770 which exits the beamsplitter 720 through the first leg 736' of the second prism 732,, and a second portion of the beam 758 to be reflected off of the interface 752'. The reflected beam 758 is incident upon the second interface 752' at a 45 degree angle such that the second portion of the reflected beam 758 is orthogonally deflected along a path parallel to the incident light beam 750, thereby forming a second outgoing beam 772. This configuration can be utilized in optical disc data systems to separate and analyze a portion of the returning read beam in many well-known focus error detection techniques.

Figure 8:
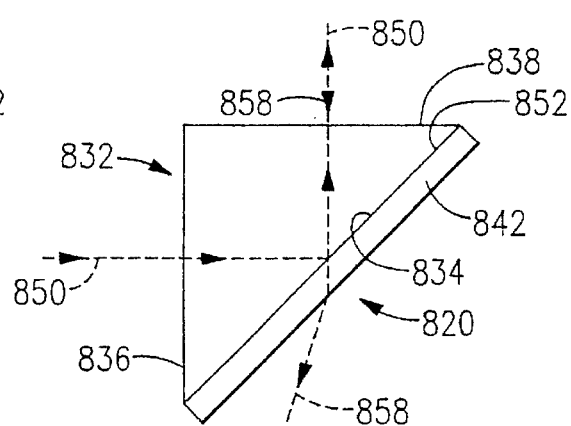
FIG. 8 is a schematic representation of a beamsplitter comprising two right-angle prisms which separates an incoming beam into two outgoing beams.

Yet another embodiment of a half-cube beamsplitter 820 is shown in FIG. 8. As shown, the beamsplitter 820 comprises a right-angle prism 832 having two legs 836, 838, a hypotenuse 834, and a flat plate 842 which is attached to the prism 832 at the hypotenuse 834. The hypotenuse 834 forms a beamsplitting interface 852 and has a polarization sensitive coating deposited thereon. An incoming light beam 850 is transmitted through the first leg 836 of the prism 832 and incident upon the interface 852 at a 45 degree angle. The beam 850 is preferably polarized such that the light is orthogonally deflected toward the second leg 838 of the prism 832. In the context of optical disc data systems, the deflected beam 850 could be directed so as to read data recorded on the surface of an optical disc. In such a system, the beam is reflected from the disc along the same path as the incident light beam 850 back toward the beamsplitter 820. The reflected beam 858 is phase shifted in polarization such that, upon striking the interface 852, the reflected beam 858 is transmitted through to the rear surface of the plate 842. At the rear surface of the plate 842, the transmissive coating allows the reflected beam 858 to be transmitted through the beamsplitter 820. Due to the differences in index of refraction between the plate 842 and the air, the transmitted beam 858 exits the plate 842 at an angle. The beam 858 could then be advantageously directed toward a photodetector for analysis of the data read from the disc and/or used in well-known focus error detection methods.

Figure 10:
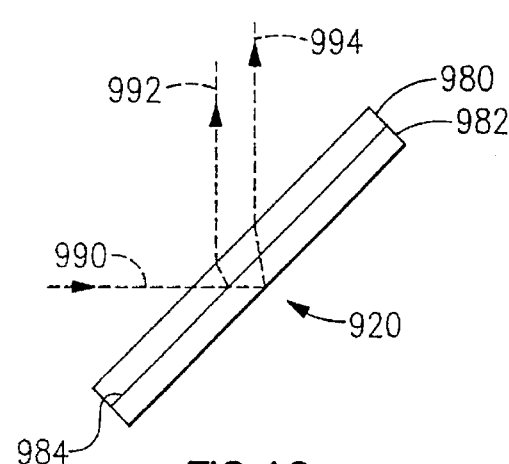
FIG. 10 is a schematic representation of a beamsplitter comprising two flat plates which separates an incoming beam into two outgoing beams with parallel offset.

FIG. 10 illustrates a further embodiment of the invention. A beamsplitter 920 is shown comprising two flat plates 980, 982 preferably having a thickness in the range of 0.5 to 2 mm which are joined at a beam splitting interface 984. The interface 984 is coated with a polarization sensitive coating. An incoming light beam 990 is transmitted through the first plate 980 and is incident upon the interface 984 such that the incoming beam 990 is split. A first portion of the beam 990 having a first, selected polarization component is reflected, forming a first outgoing beam 992, and a second portion of the beam 990 is transmitted through the interface 984 to the rear surface of the second flat plate 982. The rear surface of the plate 982 has a reflective coating deposited thereon such that the transmitted portion of the beam 990 is deflected, forming a second outgoing beam 994. The plates 980, 982 are oriented such that both portions of the beam 990 are reflected at approximately the same angle. Upon exiting the beamsplitter 920, the difference in index of refraction between the plates 980, 982 and the air causes the beams 992, 994 to exit at an angle. Thus, the beamsplitter serves to separate the incoming beam 990 into two parallel outgoing beams 992, 994 of different polarization states. In an optical disc data system, these two beams 992, 994 could be used to simultaneously read data from and write data to an optical disc, although this configuration could be used in other optical systems where it is desired to separate an incoming beam into two outgoing beams.

Figure 11:
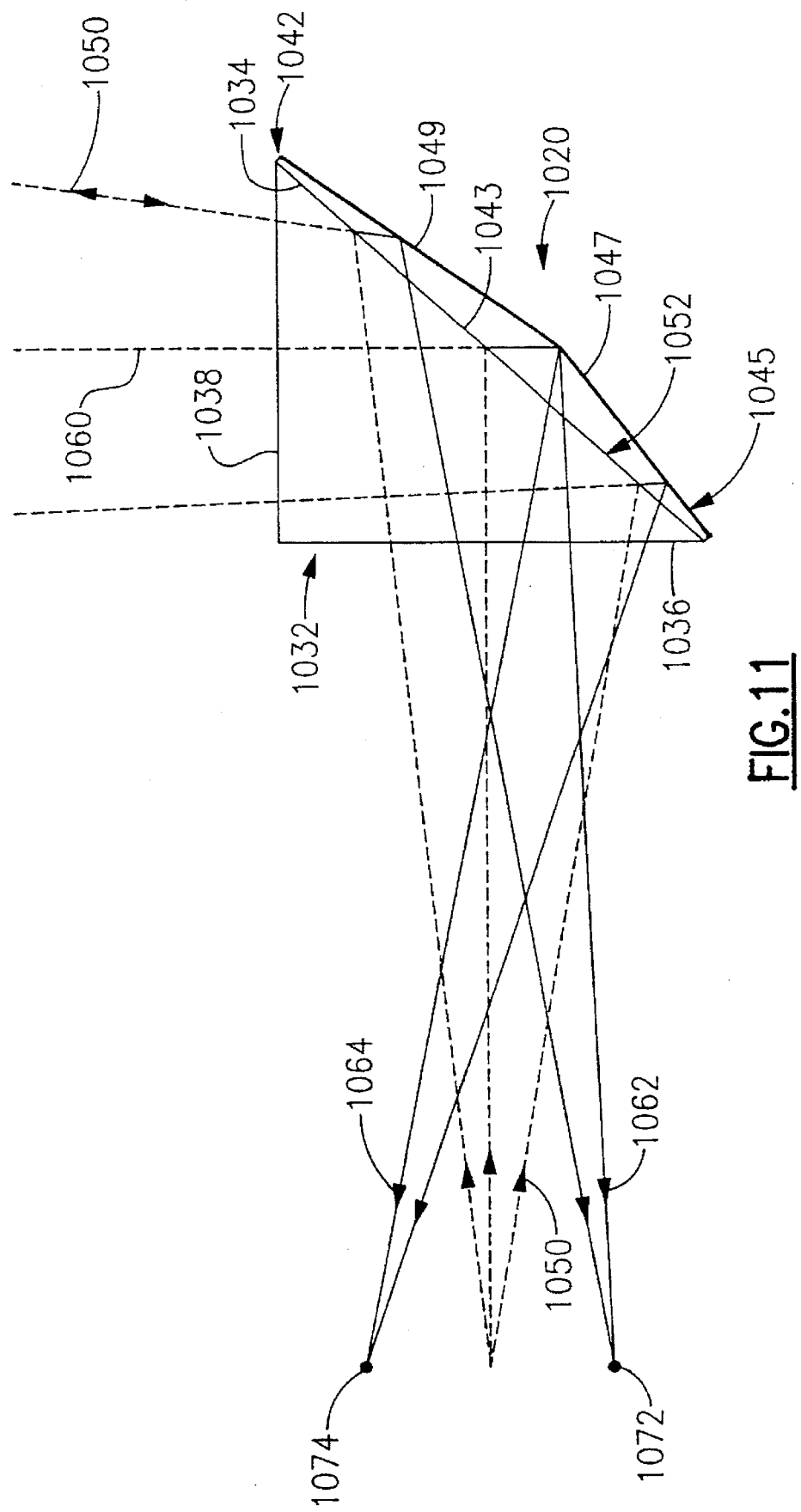
FIG. 11 is a schematic representation of a beamsplitter comprising a right-angle prism and faceted thin plate.

Yet another embodiment of the invention is shown in FIG. 11. A beamsplitter 1020 is illustrated which comprises a right angle prism 1032 having a hypotenuse 1034 which joins first and second legs 1036, 1038. A faceted thin plate 1042, such as a roof-top prism, comprising a front surface 1043 and a multi-faceted rear surface 1045 having a first portion 1047, and a second portion 1049 which is angled with respect to the first portion 1047, is attached to the hypotenuse 1034 of the prism 1032. The hypotenuse 1034 is coated with a polarization sensitive coating, or other type of optically selective coating to form a beamsplitting interface 1052 intermediate the hypotenuse 1034 and roof-top prism 1042. A diverging incoming beam 1050 is transmitted through the first leg 1036 of the right angle prism 1032 and is incident upon the beamsplitting interface 1052. The diverging beam 1050 is shown for illustrative purposes only. Other source beams, such as collimated beams with auxiliary optics could also be used. The incident beam 1050 is preferably polarized such that the beam 1050 will be reflected off of the interface 1052 and transmitted through the second leg 1038 of the prism 1032. For use in optical disc memory systems, the exiting beam could then be directed toward an optical disc. Typically the beam 1050 is reflected from the surface of the disc as a reflected beam 1060 along the path of the incident light beam 1050 and altered in polarization such that the reflected beam 1060 is phase-shifted by 90 degrees upon entering the beamsplitter 1020 through the second leg 1038 of the right angle prism 1032. As the phase-shifted beam 1060 strikes the beam splitting interface 1052, it is now transmitted through the interface 1052 to the rear surface 1045 of the roof-top prism 1042.

A portion of the reflected beam 1060 will be incident upon the first portion 1047 of the rear surface 1045 of the roof-top prism 1042, and a portion of the reflected beam 1060 will be incident upon the second portion 1049 of the rear surface 1045. Because the first portion 1047 of the rear surface is angled with respect to the second portion 1049 of the rear surface, the reflected beam 1060 is deflected from the rear surface 1045 as shown to form two beams 1062, 1064, which converge at two distinct focal points, 1072, 1074, respectively, one above and one below the source of the diverging beam 1050. If the tilt between the two angled portions 1047, 1049 of the roof top prism 1042 was rotated 90 degrees about the normal to the hypotenuse, then the return beams 1062, 1064 would separate into and out of the page.

Although the invention is illustrated with reference to specific embodiments, it will be apparent to those skilled in the art that various modifications could be made without departing from the true spirit of the invention. For example, other optically selective coatings may be used at the beamsplitting interface in addition to the polarization and wavelength sensitive coatings illustrated. For example, a differential frustrated total reflection (DFTR) coating whose transmissive/reflective properties vary as a function of the angle of incidence of incoming light could also be used. In addition, although many of the embodiments are illustrated as beamsplitters, one skilled in the art will realize that the same configuration could be reversed and used alternatively to combine beams. Furthermore, it should be recognized that the disclosed embodiments could be used with either collimated or focused light.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A miniature optical beam splitting assembly for use in an optical system, said assembly comprising:

a dual wavelength source for producing a first light beam and a second light beam, said first and second light beams being divergent having distinct wavelengths;

a right angle prism having a first leg and second leg joined by a hypotenuse wherein said first leg has a first length and said second leg has a second length, said first length and said second length each being approximately equal to each other;

an optical plate having a front surface and a rear surface, said front surface of said optical plate being positioned adjacent said hypotenuse, said optical plate having a maximum thickness which is less than said first and second lengths and extending substantially along said hypotenuse, said maximum thickness being within the range of about 0.5 mm to 2 mm;

an optically selective coating positioned intermediate said hypotenuse and said front surface of said optical plate to form a beam splitting interface;

a collimating lens having an optical axis, said collimating lens positioned between said dual wavelength source and said first leg of said right angle prism for collimating said first and second light beams before they pass through said first leg, said collimating lens thereby producing a first collimated beam and a second collimated beam wherein said first collimated beam is reflected from said beam splitting interface and passed through said second leg to form a first outgoing beam of collimated light, and said second collimated beam is reflected from said rear surface of said optical plate and passed through said second leg to form a second outgoing beam of collimated light; and a first converging lens for focusing said first outgoing beam at a first focal point and a second converging lens for focusing said second outgoing beam at a second focal point wherein said first focal point and said second focal point are located on an information storage medium, said first outgoing beam capable of reading information stored on the medium and said second outgoing beam capable of writing information onto the medium.

2. The optical beam splitting assembly according to claim 1 wherein said optically selective coating includes a wavelength sensitive coating.

3. The optical beam splitting assembly according to claim 1 wherein said rear surface of said optical plate has a reflective coating deposited thereon.

4. The optical beam splitting assembly according to claim 1 wherein a source of said first light beam is positioned above said optical axis of said collimating lens and a source of said second light beam is positioned below said optical axis so that said first collimated beam forms an angle $\Theta_1$ with said optical axis and said second collimated beam forms an angle $\Theta_2$ with said optical axis said first and second outgoing beams thereby being non-parallel.

5. The optical beam splitting assembly according to claim 1 wherein said optical plate is wedge-shaped, said front surface and said rear surface thereby being non-parallel relative to each other.

* * * * *